(12) United States Patent (10) Patent No.: US 12,140,161 B2
Hove (45) Date of Patent: Nov. 12, 2024

(54) APPARATUS AND METHOD FOR MOVING VISCOUS FLUID BY SUCTION

(71) Applicant: Danhydra A/S, Herning (DK)

(72) Inventor: Thomas Hove, Herning (DK)

(73) Assignee: DANHYDRA A/S, Herning (DK)

( * ) Notice: Subject to any disclaimer, the term of this patent is extended or adjusted under 35 U.S.C. 154(b) by 863 days.

(21) Appl. No.: 17/117,605

(22) Filed: Dec. 10, 2020

(65) Prior Publication Data

US 2021/0180615 A1  Jun. 17, 2021

(30) Foreign Application Priority Data

Dec. 13, 2019 (DK) .......................... PA 2019 01474

(51) Int. Cl.
*F04B 15/02* (2006.01)
*F04B 19/04* (2006.01)
*F04F 3/00* (2006.01)

(52) U.S. Cl.
CPC ................ *F04F 3/00* (2013.01); *F04B 15/02* (2013.01); *F04B 19/04* (2013.01)

(58) Field of Classification Search
CPC .............. F04F 3/00; F04B 15/02; F04B 19/04
See application file for complete search history.

(56) References Cited

U.S. PATENT DOCUMENTS

| 5,001,805 A | 3/1991 | Stouky et al. |
| 5,772,402 A | 6/1998 | Goodman |
| 2003/0145887 A1 | 8/2003 | Jou |
| 2007/0267097 A1 | 11/2007 | Matsumoto et al. |
| 2010/0224269 A1* | 9/2010 | Peterson ................. F04B 53/22 285/82 |
| 2012/0171051 A1* | 7/2012 | Wallace .................... F04F 3/00 92/79 |
| 2020/0088176 A1* | 3/2020 | Cleland ................... F04B 13/00 |

FOREIGN PATENT DOCUMENTS

| AU | 2014227532 A1 | 10/2014 | |
| CN | 105546315 A | 5/2016 | |
| CN | 209226938 U | 8/2019 | |
| DE | 4404882 A1 * | 8/1995 | .............. B09B 5/00 |
| FR | 2 449 810 A1 | 9/1980 | |

(Continued)

OTHER PUBLICATIONS

English Translation of DE-4404882-A1 Tammling Arthur (Year: 1994).*

(Continued)

*Primary Examiner* — P. Macade Nichols
(74) *Attorney, Agent, or Firm* — Ware, Fressola, Maguire & Barber LLP

(57) ABSTRACT

An apparatus and a method are shown for removing or moving a viscous fluid such as grease from a first unit such as a bearing e.g. a ball bearing to a second unit via a hose or pipe. According to the method, the apparatus is shown pumping a viscous fluid from an outlet (11) of a first unit (1) to an inlet (10) of a second unit (2) through a hose or pipe (7), a vacuum pump (3) is connected to the hose or pipe (7) and the viscous fluid is moved through the hose or pipe (7) by suction; wherein the hose or pipe (7) comprises an inlet (8) for gas such as air, and the flow of gas through the inlet (8) is controlled by a valve (9).

8 Claims, 1 Drawing Sheet

(56) References Cited

FOREIGN PATENT DOCUMENTS

| GB | 1 094 021 A | 12/1967 |
|---|---|---|
| JP | H06 81849 A | 3/1994 |
| JP | H09-42599 A | 2/1997 |
| JP | 2018-105295 A | 7/2018 |
| WO | 2019/062989 A1 | 4/2019 |
| WO | 2019/062991 A1 | 4/2019 |

OTHER PUBLICATIONS

Search Report, Danish Patent Office, Application No. PA 2019 01474, completed Jun. 8, 2020, 4 pages.
Office Action, Danish Patent Office, Application No. PA 2019 01474, dated Jun. 10, 2020, 3 pages.
Bibliographic data including English abstract, document CN105546315A, 2 pages.
Bibliographic data including English abstract, document CN209226938U, 2 pages.
European Search Report and Opinion, Application EP 20 21 2633, completed Apr. 29, 2021, 8 pages.
Communication pursuant to Article 94(3) EPC, Nov. 7, 2022, 4 pages.
English translation of Abstract, JP 2018-105295-A, 1 page.
English translation of Abstract, JP H06-81849-A, 1 page.

* cited by examiner

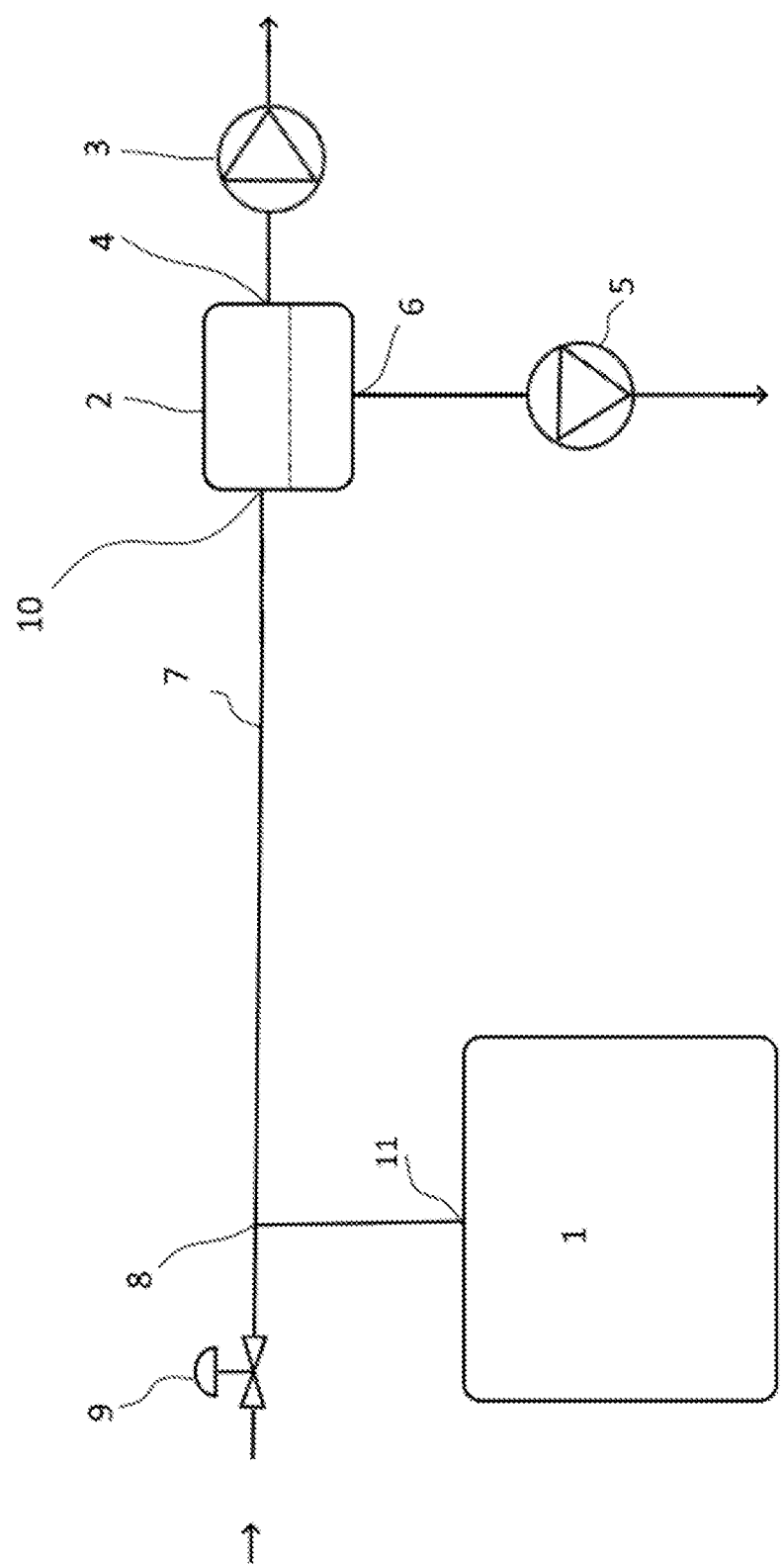

APPARATUS AND METHOD FOR MOVING VISCOUS FLUID BY SUCTION

The present invention relates to an apparatus and a method for removing or moving a viscous fluid such as grease from a first unit such as a bearing e.g. a ball bearing to a second unit via a hose or pipe.

BACKGROUND ART

When removing surplus grease from a bearing or similar space where it is not possible to force the grease out by increased pressure, it has proven to be difficult to remove the grease by suction through a hose or pipe.

U.S. Pat. No. 5,001,805 A discloses an apparatus for pumping a viscous fluid from an outlet (port 29) of a first unit (gear train housing 30) to an inlet of a second unit (waste tank 24) through a hose (5). A vacuum pump (21) is connected to the hose (5) via the second unit (24) and the viscous fluid is moved through the hose (5) by suction. The hose does not comprise an inlet for gas such as air.

The object of the present invention is to provide a pumping apparatus which does not stall when pumping the viscous fluid, but instead works effectively and constantly.

SUMMARY OF INVENTION

The present invention relates to an apparatus able to pump grease or similar viscous fluids through a hose or pipe. The objective of the present invention is to provide an apparatus which is cheaper and more robust than previously known solutions.

According to one aspect of the invention, the invention relates to an apparatus for pumping a viscous fluid from an outlet of a first unit to an inlet of a second unit through a hose or pipe, a vacuum pump is connected to the hose or pipe and the viscous fluid is moved through the hose or pipe by suction; wherein the hose or pipe comprises an inlet for gas such as air, and the flow of gas through the inlet is controlled by a valve.

According to any embodiment of the invention, the inlet may be positioned close to the first unit, e.g. closer to the first unit than to the second unit and/or e.g. less than 0.2 m or less than 0.15 m from the outlet of the first unit, and/or e.g. more than 0.05 m from the outlet.

According to any embodiment of the invention, the valve may be a needle valve or a similar valve capable of fine adjustment.

According to any embodiment of the invention, the second unit may be a separation unit comprising an outlet for viscous fluid through which outlet the viscous fluid is removed by a pump and an outlet for gas.

According to any embodiment of the invention, the first unit may be a bearing such as a ball bearing.

According to any embodiment of the invention, the viscous fluid may be grease or a similar lubricating material.

According to any embodiment of the invention, the opening of the valve may be adjusted when the apparatus is set up, and then the opening of the valve may be constant until e.g. manual or automatic re-adjustment takes place.

According to any embodiment of the invention, the hose may be made of a flexible material such as a polymer e.g. PVC, polyurethane, Nomex, polyethylene or thermoplastic, which polymer may be reinforced by fibers or similar.

According to a second aspect of the invention, the invention relates to a method for pumping i.e. by suction a viscous fluids from a first unit to a second unit through a hose or pipe, the viscous fluid is provided at an outlet of the first unit and the second unit is subjected to a constant vacuum, consequently the viscous fluid is pulled or moved into the hose or pipe, wherein a flow of gas is allowed into the hose or pipe between the outlet of the first unit and the inlet of the second unit.

According to any embodiment of the second aspect of the invention, the vacuum pump may provide a pressure p2 in the second unit of a vacuum of 1000 to 1 mbar/760 to 0.75 Torr.

LIST OF FIGURES

The sole FIGURE shows a schematic illustration of an apparatus according to the invention by which the method according to the invention may be carried out.

Throughout the application identical or similar elements of different embodiments are given the same reference numbers.

Definitions of Words

In general—when this expression is used in respect of a feature, the feature may be employed with any embodiment of the invention, even though the specific mentioning appears in the detailed part of the description.

A viscous fluid—Viscosity of a fluid determines to what degree fluids resists their shear deformation, and a viscous fluid provides resistance between the layers of the fluid which will prevent the viscous fluid from flowing in a fast manner towards an outlet thereby increasing the risk of mixing air into the fluid at the outlet during pumping.

Vacuum pump—a pump for exhausting gas from an enclosed space.

DETAILED DESCRIPTION OF INVENTION

In general, the invention relates to an apparatus for pumping a viscous fluid from an outlet of a first unit to an inlet of a second unit through a hose or pipe, a vacuum pump is connected to the hose or pipe e.g. via the second unit and the viscous fluid is moved through the hose or pipe by suction.

FIG. 1 illustrates an embodiment of an apparatus according to the invention comprising a first unit 1 comprising an outlet 11 and a second unit 2 comprising an inlet 10, an outlet 4 for gas and an outlet 6 for viscous fluid.

The apparatus further comprises a hose or pipe 7 providing a connection for viscous fluid between the outlet 11 of the first unit and the inlet 10 of the second unit. The apparatus also comprises a vacuum pump 3 providing a vacuum in the hose or pipe 7 e.g. by providing a vacuum in the second unit 2. Due to the vacuum provided by the vacuum pump 3, viscous fluid is moved from the first unit 1 through the hose or pipe 7 and into second unit 2 by suction.

The second unit 2 serves as a separation unit in which gas and viscous fluid are separated in order to allow the vacuum pump to function. Normally, the viscous fluid flows or falls to the bottom of the second unit 2, and the outlet for viscous fluid 6 may therefore be positioned at the bottom of the second unit. The outlet 4 for gas is normally positioned at the upper half of the second unit. The viscous fluid may be removed through the outlet 6 by positive displacement pump 5 such as a rotary pump or similar and the gas is removed from the second unit 2 by a vacuum pump 3, the inlet 10 to the second unit may be a simple permanent opening and the vacuum pump 3 may this way be directly connected to the hose or pipe 7. The outlet 6 for viscous fluid is normally positioned at the bottom of the second unit 2.

The pressure p1 in the first unit is relatively constant and around atmospheric pressure, the pressure p2 in the second unit is also relatively constant and below atmospheric pressure, e.g. below 800 mbar, or below 500 mbar, or below 200 mbar.

The hose or pipe 7 comprises an inlet 8 for gas and a valve 9 controls the flow of gas allowed through the inlet 8. The gas is normally air as air is cheap and available, but the gas may alternatively be a either a functional gas or a neutral gas such as nitrogen.

The gas inlet 8 is normally positioned relatively close to outlet 11 of viscous fluid from the first unit 1, and how close the gas inlet 8 is positioned to the outlet 11 may depend on the diameter of the hose or pipe 7 and of the viscosity of the viscous fluid. In general, the gas inlet 8 is positioned closer to outlet 11 of the first unit (1) than to inlet 10 of the second unit (2). For a hose or pipe 7 having an inner diameter of between 0.5-2 cm, the gas inlet 8 is positioned e.g. less than 0.2 m or less than 0.15 m from the outlet 11 of the first unit 1, and/or e.g. more than 0.05 m from the outlet 11.

The valve 9 may e.g. be a needle valve or a similar valve which is capable of fine adjustment.

The first unit 1 may be a bearing such as a ball bearing, and the viscous fluid may be grease or a similar lubricating material.

Normally, the opening of the valve 9 is adjusted when the apparatus and the process is set up for operation, and then the opening of the valve is normally constant during operation or e.g. until a manual or automatic re-adjustment takes place due to optimization or adaptation in response to a change of the process or apparatus.

The hose or pipe may be made of a flexible material such as a polymer e.g. PVC, polyurethane, Nomex, polyethylene or thermoplastic, which polymer may be reinforced by fibers or similar. The material of the hose or pipe is adapted to the process where it is to be used, e.g. if the temperature of the viscous fluid is increased the material constituting the hose or pipe should be able to withstand the increased temperature.

With reference to the sole FIGURE, the invention also relates to a method for pumping a viscous fluids from the first unit 1 to the second unit 2 via the hose or pipe 7, the viscous fluid is provided at the outlet 11 of the first unit while the second unit 2 is subjected to a constant vacuum, consequently the viscous fluid is pulled or moved by suction into the hose or pipe. A flow of gas is allowed into the hose or pipe through the inlet 8 positioned between the outlet 11 of the first unit and the inlet 10 of the second unit 2.

The vacuum pump 3 may provide a pressure in the second unit 2 between 1 and 900 mbar, e.g. between 1 and 800 mbar, e.g. between 1 and 500 mbar.

| Ref. no. | Ref. name |
|---|---|
| 1 | First unit |
| 2 | Second unit such as a container |
| 3 | Vacuum pump |
| 4 | Gas outlet from second unit |
| 5 | Positive displacement pump such as a rotary pump |
| 6 | Outlet for viscous fluid from second unit |
| 7 | Hose or pipe |
| 8 | Inlet for gas |
| 9 | Valve |
| 10 | Inlet to second unit |
| 11 | Outlet from first unit |

The invention claimed is:

1. An apparatus for pumping a viscous fluid from an outlet (11) of a first unit (1) to an inlet (10) of a second unit (2) through a hose or pipe (7), a vacuum pump (3) is connected to the hose or pipe (7) and the viscous fluid is moved through the hose or pipe (7) by suction;
   wherein the hose or pipe (7) comprises an inlet (8) for gas such as air, and the flow of gas through the inlet (8) is controlled by a valve (9), wherein the first unit (1) is a bearing such as a ball bearing.

2. The apparatus according to claim 1, wherein the inlet (8) is positioned close to the first unit (1), or closer to the first unit (1) than to the second unit (2), or less than 0.2 m or less than 0.15 m from the outlet (11) of the first unit (1), or more than 0.05 m from the outlet (11).

3. The apparatus according to claim 1, wherein the valve (9) is a needle valve or a similar valve capable of fine adjustment.

4. The apparatus according to claim 1, wherein the second unit (2) is a separation unit comprising an outlet (6) for viscous fluid through which outlet (6) the viscous fluid is removed by a pump (5) and an outlet (4) for gas.

5. The apparatus according to claim 1, wherein the viscous fluid is grease or a similar lubricating material.

6. The apparatus according to claim 1, wherein the opening of the valve (9) is adjusted when the apparatus is set up, and then the opening of the valve is constant until manual or automatic re-adjustment takes place.

7. The apparatus according to claim 1, wherein the hose is made of a flexible material selected from the group consisting of PVC, polyurethane, Nomex, polyethylene or thermoplastic, which polymer may be reinforced by fibers.

8. A method for pumping a viscous fluid from a first unit to a second unit through a hose or pipe, wherein the viscous fluid is provided at an outlet of the first unit and the second unit is subjected to a constant vacuum, consequently the viscous fluid is pulled or moved into the hose or pipe,
   wherein a flow of gas is allowed into the hose or pipe between the outlet of the first unit and the inlet of the second unit, wherein the vacuum pump provides a pressure p2 in the second unit of a vacuum of 1000 to 1 mbar/760 to 0.75 Torr.

\* \* \* \* \*